(12) United States Patent
Holman et al.

(10) Patent No.: US 11,552,368 B2
(45) Date of Patent: Jan. 10, 2023

(54) SYSTEMS AND METHODS FOR IMPROVING SAFETY FEATURES IN ELECTROCHEMICAL CELLS

(71) Applicants: 24M Technologies, Inc., Cambridge, MA (US); Kyocera Corporation, Kyoto (JP)

(72) Inventors: Richard Holman, Wellesley, MA (US); Ricardo Bazzarella, Woburn, MA (US); Takaaki Fukushima, Okayama (JP); Matt Tyler, New York, NY (US); Naoki Ota, Lexington, MA (US)

(73) Assignees: 24M Technologies, Inc., Cambridge, MA (US); Kyocera Corporation, Kyoto (JP)

( * ) Notice: Subject to any disclaimer, the term of this patent is extended or adjusted under 35 U.S.C. 154(b) by 0 days.

(21) Appl. No.: 15/886,281

(22) Filed: Feb. 1, 2018

(65) Prior Publication Data

US 2018/0233722 A1    Aug. 16, 2018

Related U.S. Application Data

(60) Provisional application No. 62/453,197, filed on Feb. 1, 2017.

(51) Int. Cl.
*H01M 2/12* (2006.01)
*H01M 10/52* (2006.01)
*H01M 10/0525* (2010.01)
*H01M 50/342* (2021.01)

(52) U.S. Cl.
CPC ..... *H01M 50/342* (2021.01); *H01M 10/0525* (2013.01); *H01M 10/52* (2013.01)

(58) Field of Classification Search
CPC ............ H01M 10/0525; H01M 10/52; H01M 2200/20; H01M 2/021; H01M 2/0212; H01M 2/1235; H01M 2/34; H01M 2/345
See application file for complete search history.

(56) References Cited

U.S. PATENT DOCUMENTS

| | | |
|---|---|---|
| 3,023,259 A | 2/1962 | Coler et al. |
| 3,148,322 A | 9/1964 | Booe et al. |
| 3,715,697 A | 2/1973 | Them |
| 3,918,995 A | 11/1975 | Palmer et al. |
| 4,992,339 A | 2/1991 | Georgopoulos |

(Continued)

FOREIGN PATENT DOCUMENTS

| | | |
|---|---|---|
| CN | 1268254 A | 9/2000 |
| CN | 1571882 A | 1/2005 |

(Continued)

OTHER PUBLICATIONS

International Search Report and Written Opinion for International Application No. PCT/US2018/016406, dated May 18, 2018, 11 pages.

(Continued)

*Primary Examiner* — Zhongqing Wei
(74) *Attorney, Agent, or Firm* — Cooley LLP

(57) ABSTRACT

Embodiments described herein relate generally to systems and methods for improving safety features in electrochemical cells. In particular, the systems and methods as described herein can solve safety issues concerning gas generation in electrochemical cells.

14 Claims, 7 Drawing Sheets

(56) References Cited

U.S. PATENT DOCUMENTS

| | | |
|---|---|---|
| 5,776,627 A | 7/1998 | Mao et al. |
| 5,879,832 A | 3/1999 | Vu et al. |
| 5,998,051 A | 12/1999 | Poirier et al. |
| 6,168,880 B1 | 1/2001 | Snyder et al. |
| 6,204,635 B1 | 3/2001 | Sullivan |
| 6,544,679 B1 | 4/2003 | Petillo et al. |
| 6,562,517 B1 | 5/2003 | Misra et al. |
| 7,952,330 B2 | 5/2011 | Mori |
| 8,722,226 B2 | 5/2014 | Chiang et al. |
| 8,722,227 B2 | 5/2014 | Chiang et al. |
| 8,749,341 B2 | 6/2014 | Takeda et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,236,537 B2 | 3/2019 | Hamaguchi et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,665,836 B2 | 5/2020 | Cho et al. |
| 10,777,852 B2 | 9/2020 | Woodford et al. |
| 10,854,869 B2 | 12/2020 | Bazzarella et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 2001/0038938 A1* | 11/2001 | Takahashi ............... H01G 2/14 429/53 |
| 2004/0028995 A1* | 2/2004 | Shelekhin ............ H01M 2/0202 429/56 |
| 2004/0081890 A1 | 4/2004 | Xing et al. |
| 2009/0286139 A1 | 11/2009 | Awano |
| 2009/0315666 A1 | 12/2009 | Ueda et al. |
| 2010/0021821 A1 | 1/2010 | Kim et al. |
| 2010/0047671 A1 | 2/2010 | Chiang et al. |
| 2010/0255351 A1 | 10/2010 | Ijaz et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0121936 A1 | 5/2012 | Baek et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0011060 A1 | 1/2014 | Yang et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170450 A1 | 6/2014 | Takahashi et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0140410 A1 | 5/2015 | Kim et al. |
| 2015/0171406 A1 | 6/2015 | Bazzarella et al. |
| 2015/0180033 A1 | 6/2015 | Oyama et al. |
| 2015/0280185 A1 | 10/2015 | Lampe-Onnerud et al. |
| 2015/0280202 A1 | 10/2015 | Lee et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0020042 A1 | 1/2016 | Stanton et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0141593 A1* | 5/2016 | Min ..................... H01M 2/06 429/61 |
| 2016/0190544 A1 | 6/2016 | Slocum et al. |
| 2016/0211502 A1 | 7/2016 | Choi et al. |
| 2016/0218375 A1 | 7/2016 | Chiang et al. |
| 2016/0240896 A1 | 8/2016 | Zhang et al. |
| 2016/0268621 A1 | 9/2016 | Chiang et al. |
| 2016/0308218 A1 | 10/2016 | Ota et al. |
| 2016/0315301 A1 | 10/2016 | Kim et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0279108 A1 | 9/2017 | Herle |
| 2017/0288281 A1 | 10/2017 | Chiang et al. |
| 2018/0034090 A1 | 2/2018 | Chiang et al. |
| 2018/0102521 A1* | 4/2018 | Cho ..................... H01M 50/172 |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0249678 A1 | 8/2021 | Chiang et al. |

(56) References Cited

U.S. PATENT DOCUMENTS

| | | |
|---|---|---|
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |

FOREIGN PATENT DOCUMENTS

| | | | |
|---|---|---|---|
| CN | 101103509 A | 1/2008 | |
| CN | 101595546 A | 12/2009 | |
| CN | 101617419 A | 12/2009 | |
| CN | 102460771 A | 5/2012 | |
| CN | 102483046 A | 5/2012 | |
| CN | 102800525 A | 11/2012 | |
| CN | 106953059 A | 7/2017 | |
| KR | 10-2013-0064465 | 6/2013 | |
| KR | 10-2014-0012264 A | 2/2014 | |
| TW | 533641 B | 5/2003 | |
| WO | WO 2013/132228 | 9/2013 | |
| WO | WO 2016/049213 A1 | 3/2016 | |
| WO | WO 2016/132119 A1 | 8/2016 | |
| WO | WO 2016/178540 | 11/2016 | |
| WO | WO-2016178540 A1 * | 11/2016 | .......... H01M 50/317 |
| WO | WO 2016/205663 | 12/2016 | |

OTHER PUBLICATIONS

International Search Report and Written Opinion for International Application No. PCT/US2018/025375, dated Jun. 27, 2018, 7 pages.

International Search Report and Written Opinion for International Application No. PCT/US2018/044378, dated Oct. 15, 2018, 8 pages.

Office Action for U.S. Appl. No. 15/941,673, dated Dec. 10, 2019, 7 pages.

Office Action for U.S. Appl. No. 16/104,480, dated Apr. 17, 2020, 10 pages.

Partial Supplementary European Search Report for European Application No. 18748587.5, dated Nov. 6, 2020, 11 pages.

Office Action for U.S. Appl. No. 16/048,765, dated Dec. 11, 2020, 6 pages.

Extended European Search Report for European Application No. 18748587.5, dated Feb. 8, 2021, 13 pages.

Cannarella, J. et al., "Stress evolution and capacity fade in constrained lithium-ion pouch cells," Journal of Power Sources, vol. 245, Jul. 2013, pp. 745-751.

Office Action for Chinese Application No. 201880018682.5, dated Sep. 26, 2021, 7 pages.

Office Action for Chinese Application No. 201880061848.1, dated Aug. 3, 2021, 23 pages.

Office Action for U.S. Appl. No. 17/078,814, dated May 13, 2022, 20 pages.

Notice of Allowance for U.S. Appl. No. 16/048,765, dated Jun. 15, 2022, 7 pages.

* cited by examiner

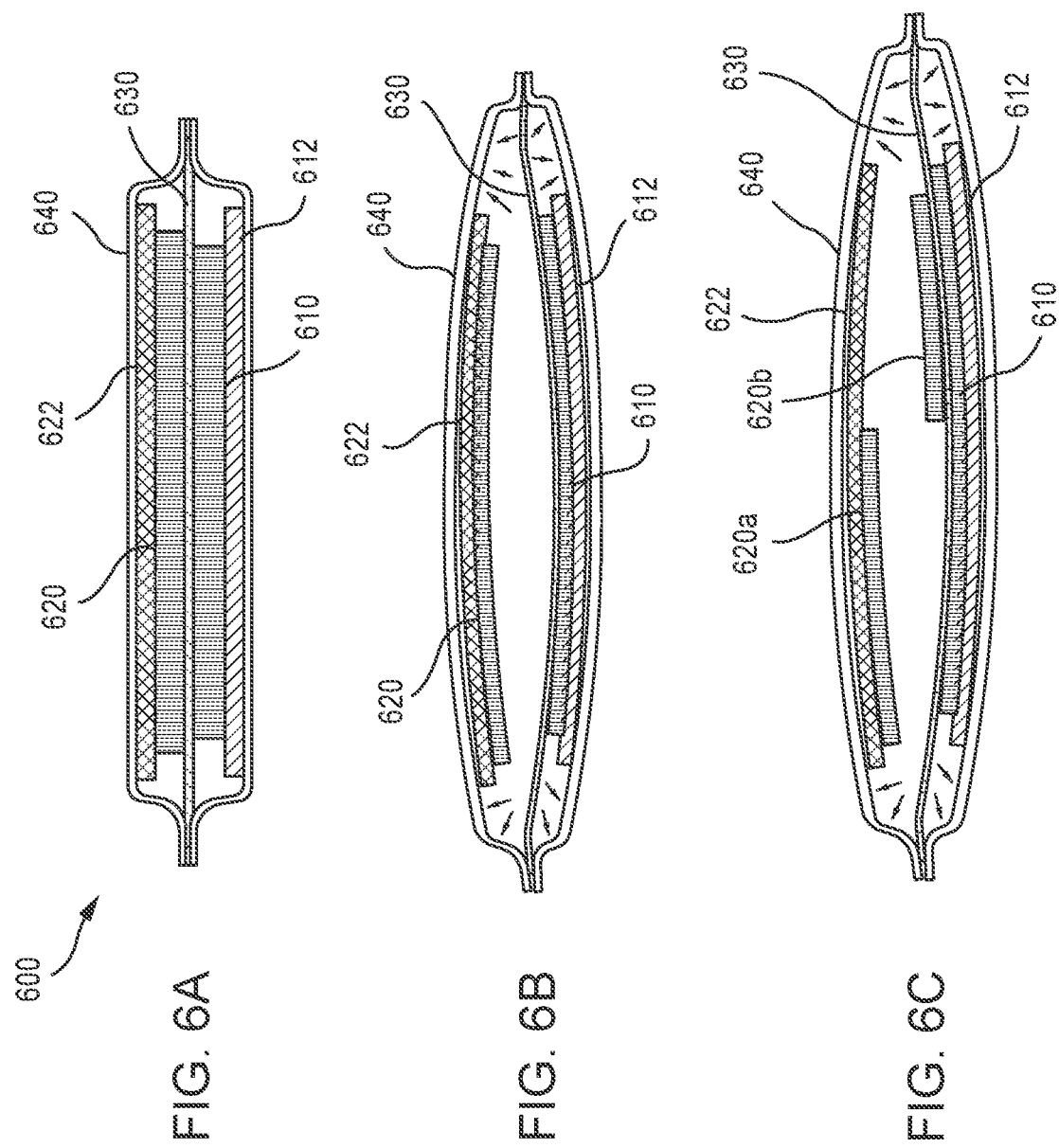

SYSTEMS AND METHODS FOR IMPROVING SAFETY FEATURES IN ELECTROCHEMICAL CELLS

CROSS-REFERENCE TO RELATED APPLICATIONS

This application claims priority to and the benefit of U.S. Provisional Patent Application Ser. No. 62/453,197, filed Feb. 1, 2017 and titled "Systems and Methods for Improving Safety Features in Electrochemical Cells," the disclosure of which is hereby incorporated by reference in its entirety.

BACKGROUND

While lithium-ion batteries (or electrochemical cells) have become ubiquitous, consumer safety of these devices has also become paramount. Under routine operation, electrochemical reactions take place inside a lithium-ion battery to generate electricity. These reactions also produce byproducts. In particular, generation of gaseous products during the formation, operation, and storage of lithium-ion batteries poses a formidable technological challenge. Gasses released during the formation require an extra degassing process, thus increasing the production costs. Gas evolution during cycling of the formed cells, especially under overcharge conditions, can lead to internal pressure build-up, performance degradation, and potential safety failures. Gas generation during storage can result in diminished shelf life of the product, particularly at elevated temperatures. The predicament can also be challenging for cells packaged in soft foil laminate plastics, due to the potentially detrimental dimensional changes and package breach.

SUMMARY

Embodiments described herein relate generally to systems and methods for improving safety features in electrochemical cells. In particular, the systems and methods described herein can solve safety issues concerning gas generation in electrochemical cells.

In some embodiments, an apparatus includes a casing for an electrochemical cell, the casing including a first portion having a first sealing region, and a second portion having a second sealing region. The first portion of the casing can be configured to partially define a first cavity configured to receive a cathode and the second portion of the casing can be configured to partially define a second cavity configured to receive an anode. A separator is disposed between the cathode and the anode and is coupled to a portion of the first sealing region and a portion of the second sealing region. A fluid flow path is disposed between a portion of the first sealing portion and the second sealing portion and is configured to allow gas generated during operation of the electrochemical cell to flow from at least one of the first cavity and the second cavity to a region outside of the casing.

In some embodiments, the apparatus can include a third cavity fluidically coupled to at least one of the first cavity and the second cavity, the third cavity configured to receive the gas generated during operation of the electrochemical cell. In some embodiments, the third cavity is external to the casing. In some embodiments, the third cavity is fluidically coupled to at least one of the first cavity and the second cavity in a first configuration, and fluidically isolated from the first cavity and the second cavity in a second configuration. In some embodiments, the third cavity is configured to be removable from the casing in the second configuration. In some embodiments, the third cavity has a volume between about 5% to about 50% of a volume of the casing.

In some embodiments, the apparatus is configured such that the separator extends through the first sealing region and the second sealing region to form the fluid flow path from at least one of the first cavity and the second cavity to the region outside of the casing. In some embodiments, the portion of the separator forming the fluid flow path is porous. In some embodiments, the fluid flow path is configured to fluidically communicate the gas without interfering with normal operation of the electrochemical cell. In some embodiments, the porous portion of the separator has a porosity of about 1% to about 90%. In some embodiments, the porous portion of the separator has pores having a dimension of about 1 μm to about 200 μm.

In some embodiments, the apparatus includes a casing for an electrochemical cell, the casing including a first portion having a first sealing region, and a second portion having a second sealing region. The first portion of the casing is configured to partially define a first cavity configured to receive a cathode, and the second portion of the casing is configured to partially define a second cavity configured to receive an anode. A separator is disposed between the cathode and the anode and coupled to a portion of the first sealing region and a portion of the second sealing region.

In some embodiments, the apparatus can include a safety mechanism operably coupled to the electrochemical cell and configured to terminate electrical operation of the electrochemical cell when a gas pressure within at least one of the first cavity and the second cavity exceeds a threshold. In some embodiments, the safety mechanism can include a thinned portion of the casing configured to open when the gas pressure within at least one of the first cavity and the second cavity exceeds the threshold. In some embodiments, the threshold gas pressure is between about 5 psi and about 2,000 psi. In some embodiments, the threshold gas pressure is greater than about 40% of a predicted gas pressure at which the electrochemical cell will catastrophically fail. In some embodiments, the thinned portion has a thickness ratio of less than about 0.5 compared to other portions of the casing.

In some embodiments, the safety mechanism can include a circuit interrupt device configured to disconnect the electrochemical cell from an electrical circuit when the gas pressure within at least one of the first cavity and the second cavity exceeds the threshold. In some embodiments, the apparatus further includes a cathode tab electrically coupled to the cathode and an anode tab electrically coupled to the anode. In some embodiments, the circuit interrupt device can include a narrow portion formed in at least one of the cathode tab and the anode tab, the narrow portion configured to break when the gas pressure within at least one of the first cavity and the second cavity exceeds the threshold.

In some embodiments, the apparatus is configured such that the cathode is electrically coupled to a cathode current collector and the safety mechanism is configured to physically separate the cathode from at least one of the cathode current collector and the separator when the gas pressure within at least one of the first cavity and the second cavity exceeds the threshold thereby terminating electrical operation of the electrochemical cell.

In some embodiments, the apparatus is configured such that the anode is electrically coupled to an anode current collector and the safety mechanism is configured to physically separate the anode from at least one of the anode current collector and the separator when the gas pressure within at least one of the first cavity and the second cavity exceeds the threshold thereby terminating electrical operation of the electrochemical cell.

In some embodiments, the apparatus includes a casing for an electrochemical cell, the casing including a first portion having a first sealing region, and a second portion having a second sealing region. The first portion of the casing is configured to partially define a first cavity configured to receive a cathode, and the second portion of the casing is configured to partially define a second cavity configured to receive an anode. A separator is disposed between the cathode and the anode and coupled to the first sealing region and the second sealing region, a portion of the separator extending through the first sealing region and the second sealing region to create a fluid flow path from at least one of the first cavity and the second cavity to a region outside of the casing.

In some embodiments, the portion of the separator forming the fluid flow path is porous. In some embodiments, the porous portion of the separator has a porosity of about 1% to about 90%. In some embodiments, the porous portion of the separator has pores having a dimension of about 1 μm to about 200 μm. In some embodiments, the porous portion of the separator is configured to allow gas generated during operation of the electrochemical cell to flow from at least one of the first cavity and the second cavity to the region outside of the casing. In some embodiments, the fluid flow path is configured to fluidically communicate the gas without interfering with normal operation of the electrochemical cell. In some embodiments, the gas is formed at least one of during formation of the electrochemical cell, during normal operation of the electrochemical cell, and when the gas pressure within the casing exceeds a threshold. In some embodiments, the threshold gas pressure is between about 5 psi and about 2,000 psi. In some embodiments, the threshold gas pressure is greater than about 40% of a predicted gas pressure at which the electrochemical cell will catastrophically fail.

BRIEF DESCRIPTION OF THE DRAWINGS

FIGS. 6A-6C show schematics of a safety mechanism employing delamination of electrodes, according to some embodiments.

DETAILED DESCRIPTION

Figure 1B:
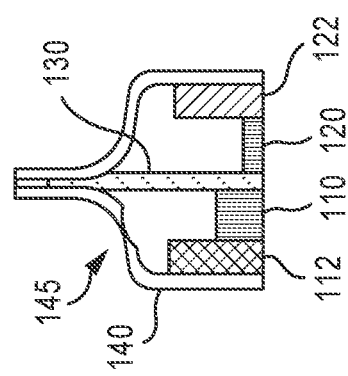
FIGS. 1A-1C show schematics of an electrochemical cell including a vent for releasing gases generated during the operation of the cell, according to embodiments.

Embodiments described herein relate generally to systems and methods for improving safety features in electrochemical cells. In particular, the systems and methods described herein can improve safety with respect to gas generation in electrochemical cells.

Gas generation as a result of electrolyte decomposition is typically one of the major issues of high-performance rechargeable batteries, particularly lithium-ion ("Li-ion") based batteries. For example, continuous gassing due to oxidation and reduction of electrolyte solvent occurs in high voltage $LiNi_{0.5}Mn_{1.5}O_4$/graphite pouch cells. In addition, metal dissolution in the electrolyte and decomposition products resulting from the high potentials can adversely affect the gas generation, particularly in the first charge cycle (i.e., during graphite solid-electrolyte interface layer formation).

Out of various designs of Li-ion batteries, pouch cells are widely used because they are flexible and lightweight, and can achieve high packaging efficiency (e.g., about 90% to 95%). In a typical pouch cell, conductive foil tabs are welded to the electrode and sealed to the pouch to carry the positive and negative terminals outside of the pouch.

In pouch cells, gas generation can lead to swelling and the pressure from swelling can crack a battery cover open and in some cases break the display or electronic circuit. Conventionally, manufacturers add excess film to create a "gas bag" outside a pouch cell to contain gas during the first charge. Then the gas bag can be cut off and the pack is resealed as part of the finishing process. However, this approach does not address the concerns of gas buildup during subsequent charges, especially after the batteries are delivered to customers.

In some embodiments, an apparatus includes a casing for an electrochemical cell, the casing including a first portion having a first sealing region, and a second portion having a second sealing region. The first portion of the casing can be configured to partially define a first cavity configured to receive a cathode and the second portion of the casing can be configured to partially define a second cavity configured to receive an anode. A separator is disposed between the cathode and the anode and is coupled to a portion of the first sealing region and a portion of the second sealing region. A fluid flow path is disposed between a portion of the first sealing portion and the second sealing portion and is configured to allow gas generated during operation of the electrochemical cell to flow from at least one of the first cavity and the second cavity to a region outside of the casing.

In some embodiments, the apparatus can include a third cavity fluidically coupled to at least one of the first cavity and the second cavity, the third cavity configured to receive the gas generated during operation of the electrochemical cell. In some embodiments, the third cavity is external to the casing. In some embodiments, the third cavity is fluidically coupled to at least one of the first cavity and the second cavity in a first configuration, and fluidically isolated from the first cavity and the second cavity in a second configuration. In some embodiments, the third cavity is configured to be removable from the casing in the second configuration. In some embodiments, the third cavity has a volume between about 5% to about 50% of a volume of the casing.

In some embodiments, the apparatus is configured such that the separator extends through the first sealing region and the second sealing region to form the fluid flow path from at least one of the first cavity and the second cavity to the region outside of the casing. In some embodiments, the portion of the separator forming the fluid flow path is porous. In some embodiments, the fluid flow path is configured to fluidically communicate the gas without interfering with normal operation of the electrochemical cell. In some embodiments, the porous portion of the separator has a porosity of about 1% to about 90%. In some embodiments, the porous portion of the separator has pores having a dimension of about 1 μm to about 200 μm.

In some embodiments, the apparatus includes a casing for an electrochemical cell, the casing including a first portion having a first sealing region, and a second portion having a second sealing region. The first portion of the casing is configured to partially define a first cavity configured to receive a cathode, and the second portion of the casing is configured to partially define a second cavity configured to receive an anode. A separator is disposed between the cathode and the anode and coupled to a portion of the first sealing region and a portion of the second sealing region.

In some embodiments, the apparatus can include a safety mechanism operably coupled to the electrochemical cell and configured to terminate electrical operation of the electrochemical cell when a gas pressure within at least one of the first cavity and the second cavity exceeds a threshold. In some embodiments, the safety mechanism can include a thinned portion of the casing configured to open when the gas pressure within at least one of the first cavity and the second cavity exceeds the threshold. In some embodiments, the threshold gas pressure is between about 5 psi and about 2,000 psi. In some embodiments, the threshold gas pressure is greater than about 40% of a predicted gas pressure at which the electrochemical cell will catastrophically fail. In some embodiments, the thinned portion has a thickness ratio of less than about 0.5 compared to other portions of the casing.

In some embodiments, the safety mechanism can include a circuit interrupt device configured to disconnect the electrochemical cell from an electrical circuit when the gas pressure within at least one of the first cavity and the second cavity exceeds the threshold. In some embodiments, the apparatus further includes a cathode tab electrically coupled to the cathode and an anode tab electrically coupled to the anode. In some embodiments, the circuit interrupt device can include a narrow portion formed in at least one of the cathode tab and the anode tab, the narrow portion configured to break when the gas pressure within at least one of the first cavity and the second cavity exceeds the threshold.

In some embodiments, the apparatus is configured such that the cathode is electrically coupled to a cathode current collector and the safety mechanism is configured to physically separate the cathode from at least one of the cathode current collector and the separator when the gas pressure within at least one of the first cavity and the second cavity exceeds the threshold thereby terminating electrical operation of the electrochemical cell.

In some embodiments, the apparatus is configured such that the anode is electrically coupled to an anode current collector and the safety mechanism is configured to physically separate the anode from at least one of the anode current collector and the separator when the gas pressure within at least one of the first cavity and the second cavity exceeds the threshold thereby terminating electrical operation of the electrochemical cell.

In some embodiments, the apparatus includes a casing for an electrochemical cell, the casing including a first portion having a first sealing region, and a second portion having a second sealing region. The first portion of the casing is configured to partially define a first cavity configured to receive a cathode, and the second portion of the casing is configured to partially define a second cavity configured to receive an anode. A separator is disposed between the cathode and the anode and coupled to the first sealing region and the second sealing region, a portion of the separator extending through the first sealing region and the second sealing region to create a fluid flow path from at least one of the first cavity and the second cavity to a region outside of the casing.

In some embodiments, the portion of the separator forming the fluid flow path is porous. In some embodiments, the porous portion of the separator has a porosity of about 1% to about 90%. In some embodiments, the porous portion of the separator has pores having a dimension of about 1 μm to about 200 μm. In some embodiments, the porous portion of the separator is configured to allow gas generated during operation of the electrochemical cell to flow from at least one of the first cavity and the second cavity to the region outside of the casing. In some embodiments, the fluid flow path is configured to fluidically communicate the gas without interfering with normal operation of the electrochemical cell. In some embodiments, the gas is formed at least one of during formation of the electrochemical cell, during normal operation of the electrochemical cell, and when the gas pressure within the casing exceeds a threshold. In some embodiments, the threshold gas pressure is between about 5 psi and about 2,000 psi. In some embodiments, the threshold gas pressure is greater than about 40% of a predicted gas pressure at which the electrochemical cell will catastrophically fail.

In some embodiments, an electrochemical cell structure is designed for removing excess gas in the cell formation stage. In some embodiments, an electrochemical cell structure is placed with strategically placed vent holes designed for alleviating increased pressure caused by generated gas during normal operating condition of electrochemical cells. In some embodiments, an electrochemical cell structure is strategically sealed with an engineered separator inside laminated electrodes designed for alleviating increased pressure caused by generated gas during normal operating condition of electrochemical cells. In some embodiments, a safety mechanism is employed to delaminate electrodes to deal with electrochemical cells that exceed a predetermined pressure threshold. In some embodiments, a safety mechanism is employed to include engineered fuses to terminate electrical connections at the connector tab for dealing with electrochemical cells that exceed a predetermined pressure threshold. In some embodiments, a safety mechanism is employed to prevent catastrophic failures in electrochemical cells by employing strategically placed needles in a can cell or battery rack including pouch cells.

As used herein, the term "about" and "approximately" generally mean plus or minus 10% of the value stated, for example about 250 μm would include 225 μm to 275 μm, and approximately 1,000 μm would include 900 μm to 1,100 μm.

Figure 1C:
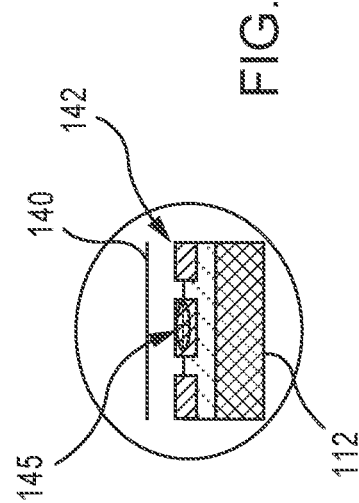
Figure 1A:
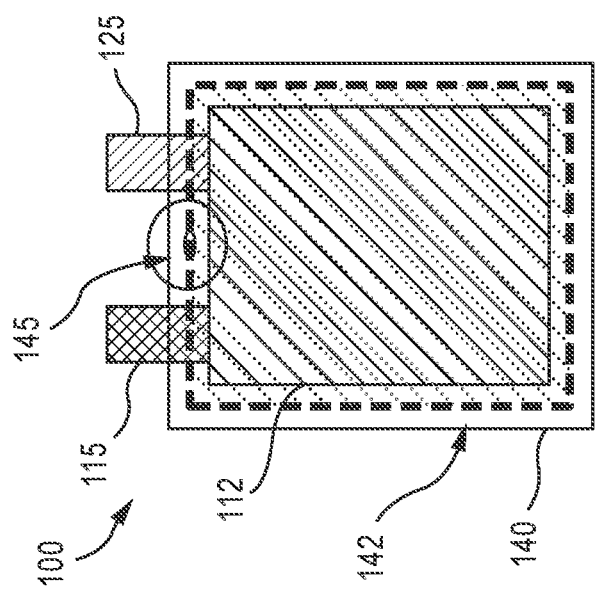

FIGS. 1A-1C show schematics of an electrochemical cell 100 including a gas vent (also simply referred to as a vent) to address gas generation and potentially high pressure in the cell. This approach can be used at various stages of its production and usage lifetime.

The electrochemical cell 100 includes a cathode 110 (also referred to as a cathode material) disposed on a cathode current collector 112, an anode 120 (also referred to as an anode material) disposed on an anode current collector 122, and a separator 130 disposed therebetween. The assembly of the cathode 110, the cathode current collector 112, the anode 120, the anode current collector 122, and the separator 130 can be contained substantially in a pouch 140, which is sealed along a sealing perimeter 142. A cathode tab 115 can be electrically connected to the cathode current collector 112 and extend beyond the pouch 140 for connection with an external circuit. Similarly, an anode tab 125 is electrically connected to the anode current collector 122 and extends beyond the pouch 140 for connection with the external circuit. In some embodiment, the cathode tab 115 can be a portion of the cathode current collector 112 extending out of the sealing perimeter 142, and the anode tab 125 can be a portion of the anode current collector 122 extending out of the sealing perimeter 142. In other words the cathode tab 115 and the anode tab 125 can be integrally formed with their respective current collector. The pouch 140 can separate the electrochemical cell 100 from adjacent cell(s) in a battery module or pack, thereby mitigation defect propagation and fire hazard. The electrochemical cell 100 further includes a vent 145 on the cathode side of the pouch 140 to release gases generated during testing and/or operation of the electrochemical cell 100, thereby regulating the pressure within the pouch 140.

In some embodiments, the cathode material 110 can include, for example, Nickel Cobalt Aluminum (NCA), Core Shell Gradient (CSG), Spinel-based lithium-ion (LMO), Lithium Iron Phosphate (LFP), Cobalt-based lithium-ion (LCO), and Nickel Cobalt Manganese (NCM), among others.

The anode material 120 can be selected from a variety of materials. In some embodiments, the anode material 120 comprises a carbon-based material, including, but are not limited to, hard carbon, carbon nanotubes, carbon nanofibers, porous carbon, and graphene. In some embodiments, the anode material 120 comprises a titanium-based oxide including, but are not limited to, spinel $Li_4Ti_5O_{12}$ (LTO) and titanium dioxide ($TiO_2$, Titania). In some embodiments, the anode material 120 comprises alloy or de-alloy material including, but are not limited to, silicon, silicon monoxide (SiO), germanium, and tin oxide ($SnO_2$). In some embodiments, the anode material 120 comprises a transition metal compound (e.g., oxides, phosphides, sulfides and nitrides). The general formula of a transition compound can be written as $M_xN_y$, where M can be selected from iron (Fe), cobalt (Co), copper (Cu), manganese (Mn), and nickel (Ni), and N can be selected from oxygen (O), phosphorous (P), sulfur (S), and nitrogen (N).

In some embodiments, the anode material 120 comprises an intermetallic compound. An intermetallic compound can be based on a formulation MM', wherein M is one metal element and M' is a different metal element. An intermetallic compound can also include more than two metal elements. The M atoms of an intermetallic compound can be, for example, Cu, Li, and Mn, and the M' element of an intermetallic compound can be, for example, Sb. Exemplary intermetallic compounds include $Cu_2Sb$, $Li_2CuSb$, and $Li_3Sb$, among others. In one example, the intermetallic compound in the anode material can have fully disordered structures in which the M or M' atoms are arranged in a random manner. In another example, the intermetallic compound in the anode material has partially disordered structures in which the M or M' atoms in the crystal lattice are arranged in a non-random manner.

In some embodiments, the anode material 120 can be porous so as to increase the surface area and enhance the rate of lithium intercalation in the resulting electrodes. In one example, the anode material 120 includes porous $Mn_2O_3$, which can be prepared by, for example, thermal decomposition of $MnCO_3$ microspheres. In another example, the anode material 120 includes porous carbon fibers prepared by, for example, electrospinning a blend solution of polyacrylonitrile and poly(l-lactide), followed by carbonization. In some embodiments, the porosity of the anode material 120 can be achieved or increased by using a porous current collector. For example, the anode material 120 can include $Cu_2Sb$, which is deposited conformally on a porous foam structure, to have certain degree of porosity.

In some embodiments, at least one of the anode material 120 or the cathode material 110 can include a semi-solid or a condensed ion-storing liquid reactant. By "semi-solid" it is meant that the material is a mixture of liquid and solid phases, for example, such as a semi-solid, particle suspension, colloidal suspension, emulsion, gel, or micelle. "Condensed ion-storing liquid" or "condensed liquid" means that the liquid is not merely a solvent as it is in the case of an aqueous flow cell catholyte or anolyte, but rather, that the liquid is itself redox-active. Such a liquid form may also be diluted by or mixed with another, non-redox-active liquid that is a diluent or solvent, including mixing with such a diluent to form a lower-melting liquid phase, emulsion or micelles including the ion-storing liquid. In some embodiments, semi-solid electrode compositions (also referred to herein as "semi-solid suspension" and/or "slurry") can include a suspension of electrochemically-active agents (anode particulates and/or cathode particulates) and, optionally, electronically conductive particles. The cathodic particles and conductive particles are co-suspended in an electrolyte to produce a cathode semi-solid. The anodic particles and conductive particles are co-suspended in an electrolyte to produce an anode semi-solid. The semi-solids are capable of flowing due to an applied pressure, gravitational force, or other imposed field that exerts a force on the semi-solid, and optionally, with the aid of mechanical vibration. Examples of batteries utilizing semi-solid suspensions are described in U.S. Pat. No. 9,362,583, entitled "SEMI-SOLID ELECTRODES HAVING HIGH RATE CAPABILITY," the entire disclosure of which is hereby incorporated by reference.

In some embodiments, one of both of the current collectors 112 and 122 can include a conductive substrate. In one example, the conductive substrate comprises a metal material such as aluminum, copper, lithium, nickel, stainless steel, tantalum, titanium, tungsten, vanadium, or their combinations or alloys. In another example, the conductive substrate comprises a non-metal material such as carbon, carbon nanotubes, or a metal oxide (e.g., TiN, $TiB_2$, $MoSi_2$, n-$BaTiO_3$, $Ti_2O_3$, $ReO_3$, $RuO_2$, $IrO_2$, etc.)

In some embodiments, one or both of the current collectors 112 and 122 can include a base substrate having one or more surface coatings so as to improve the mechanical, thermal, chemical, or electrical properties of the current collector. In one example, the coating(s) on the current collector can be configured to reduce corrosion and alter adhesion characteristics (e.g., hydrophilic or hydrophobic coatings, respectively). In another example, the coating(s) on the current collector can comprise a material of high electrical conductivity to improve the overall charge transport of the base substrate. In yet another example, the coatings can comprise a material of high thermal conductivity to facilitate heat dissipation of the base substrate and protect the battery from overheating. In yet another example, the coatings can comprise a heat-resistant or fire-retardant material to prevent the battery from fire hazards. In yet another example, the coatings can be configured to be rough so as to increase the surface area and/or the adhesion with the anode material. In yet another example, the coatings can include a material with good adhering or gluing properties with the anode material.

In some embodiments, one or both of the current collectors 112 and 122 can include a conductive substrate having a roughened surface so as to improve the mechanical, electrical, and thermal contact between the anode material and the current collector. The roughened surface of the current collector can increase the physical contact area between the anode material and the current collector, thereby increasing the adherence of the anode material to the current collector. The increased physical contact area can also improve the electrical and thermal contact (e.g., reduced electrical and thermal resistance) between the current collector and the anode material.

In some embodiments, one or both of the current collectors 112 and 122 can include a porous current collector such as a wire mesh. The wire mesh (also referred to herein as mesh) can include any number of filament wires that can be assembled in various configurations using suitable processes, such as a regular pattern or structure produced by weaving, braiding, knitting, etc. or a more random pattern or structure produced by randomly distributing wires and joining them by welding, adhesives, or other suitable techniques. Moreover, the wires comprising the mesh can be any suitable material. For example, in some embodiments, the wires are metallic such as, steel, aluminum, copper, titanium or any other suitable metal. In other embodiments, the wires can be a conductive non-metallic material such as, for example, carbon nanofiber or any other suitable material. In some embodiments, the wires can include coatings. For example, the coatings can be configured to reduce corrosion and enhance or reduce adhesion characteristics (e.g., hydrophilic or hydrophobic coatings, respectively). Examples of porous current collectors are described in U.S. Patent Publication No. U.S. 2013/0065122 A1, entitled "SEMI-SOLID ELECTRODE CELL HAVING A POROUS CURRENT COLLECTOR AND METHODS OF MANUFACTURE," the entire disclosure of which is hereby incorporated by reference.

In some embodiments, the separator 130 can be a thin, microporous membrane that electrically separates the anode 110 from the cathode 110 but allows ions to pass through the pores between the two electrolytes during discharging and charging. In some embodiments, the separator 130 includes a thermoplastic polymer, such as polyolefins, polyvinyl chlorides, nylons, fluorocarbons, and polystyrenes, among others. In some embodiments, the separator 130 includes polyolefins material that comprises, for example, polyethylene, ultra-high molecular weight polyethylene, polypropylene, polybutene, polymethylpentene, polyisoprene, copolymers thereof, and their combinations. Exemplary combinations can include, but are not limited to, mixtures containing two or more of the following polyethylene, ultra-high molecular weight polyethylene, and polypropylene, as well as, mixtures of the foregoing with copolymers such as ethylene-butene copolymer and ethylene-hexene copolymer.

The pouch 140 in the electrochemical cell 100 substantially contains the cathode 110, the cathode current collector 112, the anode 120, the anode current collector 122, and the separator 130. The pouch 140 can physically separate the electrochemical cell 100 from adjacent cells so as to mitigate or eliminate defect propagation, and to facilitate easy handling of the electrochemical cell 100 during battery manufacturing. The pouch 140 can also reduce the possibility of fire ignition of flammable electrolyte during possible welding processes in battery manufacturing, which at times generates sparks, when working with a semi-solid electrode.

In some embodiments, the cathode 110, the cathode current collector 112, the anode 120, the anode current collector 122, and the separator 130 are sealed in the pouch 140 (e.g., via vacuum sealing). In these embodiments, the pouch 140 can still reduce or eliminate chances of exposure to sparking (e.g., from welding processes) that could ignite the electrolyte. A final sealing step can be carried out after the welding process to seal one or more single pouch battery cells into an external pouch or package, in which case the external pouch or package can function as moisture control. Examples of battery architectures utilizing single pouch battery cells are described in U.S. Patent Application Publication No. U.S. 2017-0025646 A1, entitled "SINGLE POUCH BATTERY CELLS AND METHODS OF MANUFACTURE," the entire disclosure of which is hereby incorporated by reference.

In some embodiments, the pouch 140 includes a three-layer structure, namely an intermediate layer sandwiched by an outer layer and an inner layer, wherein the inner layer is in contact with the electrodes and the electrolyte. For example, the outer layer can include a nylon-based polymer film. The inner layer can include a polypropylene (PP) polymer film, which can be corrosion-resistive to acids or other electrolyte and insoluble in electrolyte solvents. The intermediate layer can include of aluminum (Al) foil. This structure allows the pouch to have both high mechanical flexibility and strength.

In some embodiments, the outer layer of the pouch 140 includes polymer materials such as polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and combinations thereof.

In some embodiments, the intermediate layer of the pouch 140 includes metal layers (foils, substrates, films, etc.) comprising aluminum (Al), copper (Cu), stainless steel (SUS), their alloys, and combinations thereof.

In some embodiments, the inner layer of the pouch 140 includes materials such as cast polypropylene (c-PP), polyethylene (PE), ethylene vinylacetate (EVA), and combinations thereof.

In some embodiments, the pouch 140 includes a two-layer structure, namely an outer layer and an inner layer. In some embodiments, the outer layer can include PET, PBT, or other materials as described above. In some embodiments, the inner layer can include PP, PE, or other materials described above.

In some embodiments, the pouch 140 can include a water barrier layer and/or gas barrier layer. In some embodiments, the barrier layer can include a metal layer and/or an oxide layer. In some embodiments, it can be beneficial to include the oxide layer because oxide layers tend to be insulating and can prevent short circuits within the battery.

In some embodiments, there can be only one (or two) unit cell(s) assembly within the pouch 140, the pouch 140 can be substantially thinner than pouches commonly used for multi-stack battery cells. In some embodiments, the pouch 140 can have a thickness less than 200 µm, less than 100 µm, or less than 50 µm. In some embodiments, the thickness of the pouch 140 can be defined as the thickness of the film that forms the pouch 140.

In some embodiments, the thickness of the pouch 140 can depend on at least two aspects. In some embodiments, it can be desirable to achieve high energy density in the resulting battery cells, in which case thinner pouches can be helpful since a larger portion of space within a battery cell can be reserved for electrode materials. In some embodiments, it can be desirable to maintain or improve the safety advantage of the pouch 140. In some embodiments, a thicker pouch can be helpful to, for example, reduce fire hazard. In some embodiments, the pouch thickness can be quantified as a ratio of the volume occupied by the pouch material to the total volume of the battery cell. In some embodiments, the pouch thickness can be about 5% to about 40% in terms of the ratio as defined above. In some embodiments, the pouch thickness can be about 10% to about 30% in terms of the ratio as defined above.

In some embodiments, the thickness of the electrochemical cell 100 (including the thickness of the pouch 140 and the thickness of the electrodes) can be about 300 µm to about 3 mm (e.g., about 300 µm, about 400 µm, about 500 µm, about 1 mm, about 2 mm, or about 3 mm, including any values and sub ranges in between).

In some embodiments, the pouch 140 includes a single layer of lower cost materials that can be thinner. In some embodiments, lower cost materials that can be thinner can be polypropylene or a combination of polyolefins that can be sealed together using heat or pressure (e.g., thermal fusion or vacuum sealing).

In some embodiments, the pouch 140 includes a single layer of fire retardant materials so as to prevent the propagation of fire hazard from one single pouch battery cell to another. In some embodiments, the pouch 140 includes an air-proof material so as to prevent the propagation of gas released by one single pouch battery cell to another, thereby reducing defect propagation.

The vent 145 in the pouch 140 can be created in various ways. In some embodiments, the vent 145 can be created from a thinned portion on the cathode side of the pouch 140. When gas is generated within the pouch 140 and the gas pressure increases accordingly, the increased pressure can break open the thinned portion on the pouch so as to make an opening (i.e., a vent) in the pouch 140.

The thickness of the thinned portion can depend on the desired threshold pressure that can create the vent 145. In some embodiments, the threshold pressure can about 5 psi to about 2,000 psi (e.g., about 5 psi, about 10 psi, about 20 psi, about 50 psi, about 100 psi, about 200 psi, about 500 psi, about 1,000 psi, or about 2,000 psi, including any values and sub ranges in between). In some embodiments, the threshold pressure can be about 10 psi to about 1,000 psi (e.g., about 10 psi, about 20 psi, about 50 psi, about 100 psi, about 200 psi, about 500 psi, or about 1,000 psi, including any values and sub ranges in between). In some embodiments, the threshold pressure can be about 2 psi to about 50 psi (e.g., about 20 psi, about 30 psi, about 40 psi, or about 50 psi, including any values and sub ranges in between).

In some embodiments, the thinned portion can have a thickness less than 100 µm (e.g., about 100 µm, about 90 µm, about 80 µm, about 70 µm, about 60 µm, about 50 µm, about 40 µm, about 30 µm, about 20 µm, or about 10 µm, including any values and sub ranges in between). In some embodiments, the ratio of the thickness of the thinned portion compared to the thickness of other portion in the pouch 140 can be less than 0.5 (e.g., about 0.5, about 0.4, about 0.3, about 0.2, or about 0.1, including any values and sub ranges in between).

In some embodiments, the vent 145 can be created from a designated portion made of a material different from the material in other portion of the pouch 140. For example, the designated portion can be made of a softer material such that increased pressure within the pouch 140 can preferentially and selectively breaks the designated portion.

The vent 145 can have various shapes. In some embodiments, the vent 145 can be round. In some embodiments, the vent 145 can be elliptical. In some embodiments, the vent 145 can be rectangular or square. In some embodiments, the vent 145 can be a narrow strip of opening in the pouch 140.

In some embodiments, the vent 145 can have a lateral dimension of about 1 µm to about 1 mm (e.g., about 1 µm, about 5 µm, about 10 µm, about 20 µm, about 50 µm, about 100 µm, about 200 µm, about 500 µm, or about 1 mm, including any values and sub ranges in between). In some embodiments, the area of the vent 145 can be about 1 µm$^2$ to about 1 mm$^2$ (e.g., about 1 µm$^2$, about 5 µm$^2$, about 10 µm$^2$, about 20 µm$^2$, about 50 µm$^2$, about 100 µm$^2$, about 200 µm$^2$, about 500 µm$^2$, or about 1 mm$^2$, including any values and sub ranges in between).

FIGS. 1A-1C show only one vent 145 for illustrating purposes. In practice, the electrochemical cell 100 can include more than one vent 145. In some embodiments, the electrochemical cell 100 can include an array of vents.

In some embodiments, the electrochemical cell 100 can include vent(s) 145 located at the bottom of the pouch 140 (opposite the side of the tabs 115 and 125). In some embodiments, the vent 145 can be located at the side edges of the pouch 140. In some embodiments, the vent 145 can be located on the front surface of the cathode side of the pouch 140.

In some embodiments, the vent 145 can further include a supporting structure such as a cross made of rigid material, to keep the vent 145 open. For example, the pouch 140 may be made of soft material and the vent 145 may tend to collapse. Using a support structure can keep the vent 145 open.

In some embodiments, the vent 145 can be sealable. For example, after the pressure within the pouch 140 drops back to a safety level, the vent 145 can collapse back to a sealed state.

Figure 2C:
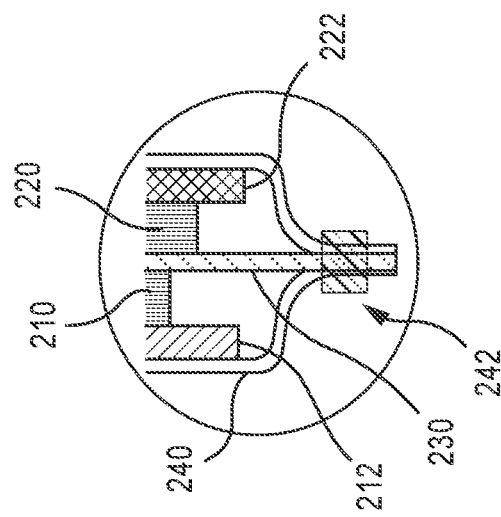
FIGS. 2A-2C show schematics of an electrochemical cell using porous separators to release gases generated during the operation of the cell, according to embodiments.
Figure 2B:
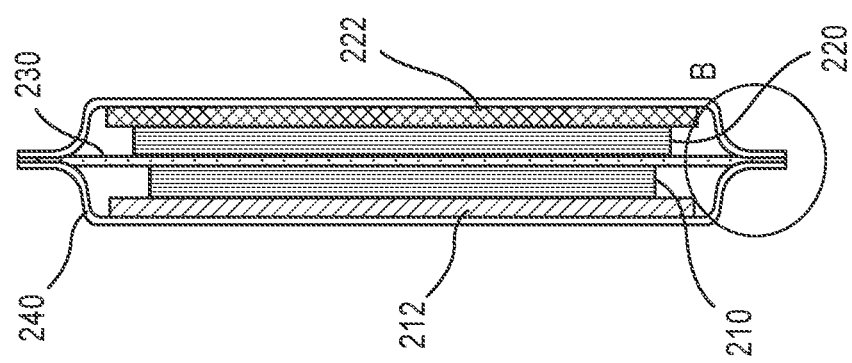
Figure 2A:
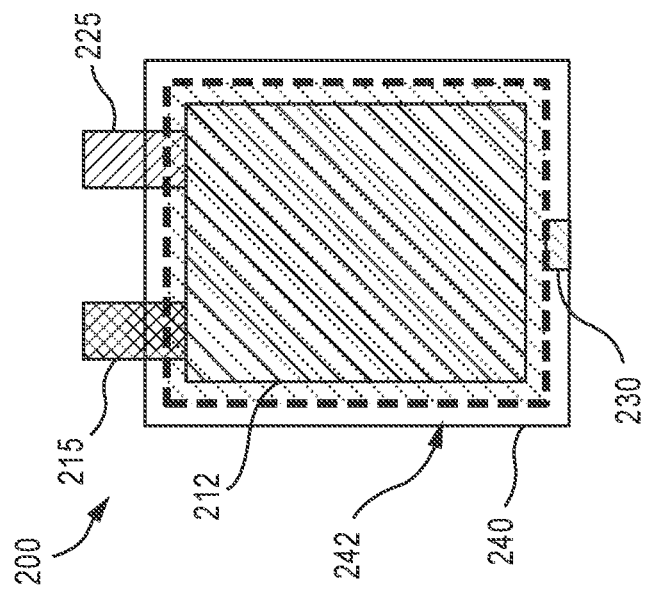

FIGS. 2A-2C show schematics of an electrochemical cell 200 using a porous separator extending beyond the sealing perimeter of the pouch so as to release gases generated within the pouch. The electrochemical cell 200 includes a cathode 210 disposed on a cathode current collector 212, an anode 220 disposed on an anode current collector 222, and a separator 230 disposed in between. The assembly of the cathode 210, the cathode current collector 212, the anode 220, the anode current collector 222, and the separator 230 is contained substantially in a pouch 240, which is sealed along a sealing perimeter 242. A cathode tab 215 is electrically connected to the cathode current collector 212 and extends beyond the pouch 240 for connection with the external circuit. Similarly, an anode tab 225 is electrically connected to the anode current collector 222 and extends beyond the pouch 240 for connection with the external circuit.

In some embodiments, the separator 230 in the electrochemical cell 200 is porous and at least a portion of the porous separator extends beyond the sealing perimeter 242 as shown in FIG. 2C. In this case, gases within the pouch 240 can slowly escape the pouch 240 by passing through the porous separator 230, thereby preventing excess pressure within the pouch 240.

The gas releasing rate (also referred to as the gas leakage rate) can depend on several parameters of the separator 230, including the porosity of the separator 230, the pore size of the separator 230, and the thickness of the separator 230.

In some embodiments, the porosity of the separator 230 can be about 1% to about 90% (e.g., about 1%, about 2%, about 5%, about 10%, about 20%, about 50%, about 60%, about 70%, about 80%, or about 90%, including any values and sub ranges in between).

In some embodiments, the size of the pores in the porous separator can be about 1 μm to about 200 μm (e.g., about 1 μm, about 2 μm, about 5 μm, about 10 μm, about 20 μm, about 50 μm, about 100 μm, about 150 μm, or about 200 μm, including any values and sub ranges in between).

In some embodiments, the thickness of the separator 230 can be about 10 μm to about 1 mm (e.g., about 10 μm, about 20 μm, about 50 μm, about 100 μm, about 200 μm, about 500 μm, about 750 μm, or about 1 mm, including any values and sub ranges in between).

In some embodiments, the portion of the separator 230 extending beyond the sealing perimeter 242 can have a length of about 100 μm to about 5 mm (e.g., about 100 μm, about 200 μm, about 500 μm, about 1 mm, about 2 mm, or about 5 mm, including any values and sub ranges in between). In some embodiments, the portion of the separator 230 extending beyond the sealing perimeter 242 can be about 1% to about 25% of the total length of the separator 230 (e.g., about 1%, about 2%, about 5%, about 10%, about 15%, about 20%, or about 25%, including any values and sub ranges in between).

In some embodiments, only a portion of the separator 230 is porous. For example, the portion around the sealing perimeter 242 can be porous while other portions of the separator 230 can be non-porous. Gasses within the pouch 240 can escape through the porous portion of the separator 230. This localized porous section can reduce possible interference with the normal function of the separator 230.

In some embodiments, the separator 230 can include a multilayer structure to construct a gas permeable path within the separator. In this case, gases within the pouch 240 can be released from the pouch 240 via the gas permeable path.

In some embodiments, the separator 230 can include a base layer coated with particles or fibers. The particle coating can be gas permeable. As a result, gases within the pouch 240 can be released via the particle coating on the surface of the separator 230. In some embodiments, the particles can include ceramic particles or/and fibers. In some embodiments, the ceramic particles can include particles of $Al_2O_3$, $TiO_2$, $ZrO_2$, AlO(OH), and/or $AlF_3$, among others.

In some embodiments, the separator 230 can include a base layer coated with other plastic particles and fibers. The plastic coating can be gas permeable. As a result, gases within the pouch 240 can be released via the particle coating on the surface of the separator 230. In some embodiments, the particles can include polyimide (PI), polyamide-imide (PAI), polyether ether ketone (PEEK), polyethersulfone (PES), polyphenylene sulfide (PPS), and/or Phenol Polymer, among others.

In some embodiments, the particle size can be about 1 μm to about 200 μm (e.g., about 1 μm, about 2 μm, about 5 μm, about 10 μm, about 20 μm, about 50 μm, about 100 μm, about 150 μm, or about 200 μm, including any values and sub ranges in between).

In some embodiments, the thickness of the particle coating can be about 1 μm to about 200 μm (e.g., about 1 μm, about 2 μm, about 5 μm, about 10 μm, about 20 μm, about 50 μm, about 100 μm, about 150 μm, or about 200 μm, including any values and sub ranges in between).

Figure 3:
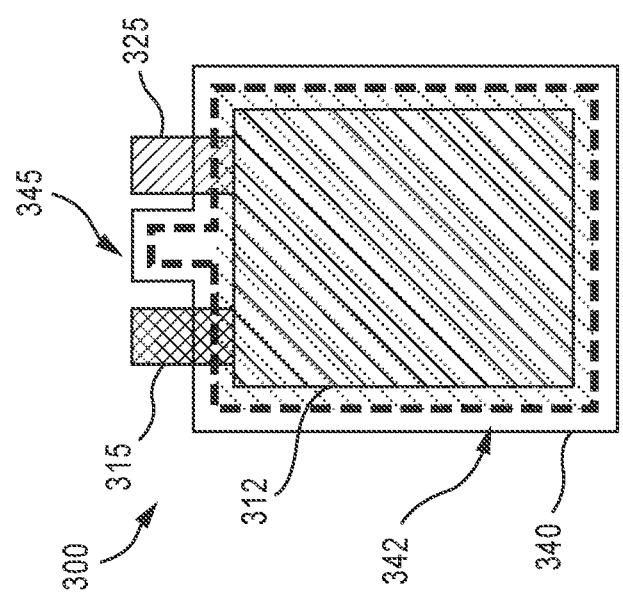
FIG. 3 shows a schematic of an electrochemical cell including a secondary pouch to absorb gases and regulate gas pressure inside the cell, according to embodiments.

FIG. 3 shows a front view of an electrochemical cell 300 including a degassing tail (also referred to as a secondary pouch) to regulate gas pressure. The electrochemical cell 300 includes a cathode (not seen from the front view) disposed on a cathode current collector 312, an anode disposed on an anode current collector (not seen from the front view), and a separator disposed in between. The assembly of the cathode, the cathode current collector 312, the anode, the anode current collector, and the separator is contained substantially in a pouch 340, which is sealed along a sealing perimeter 342. A cathode tab 315 is electrically connected to the cathode current collector 312 and extends beyond the pouch 340 for connection with the external circuit. Similarly, an anode tab 325 is electrically connected to the anode current collector and extends beyond the pouch 340 for connection with the external circuit.

The pouch 340 includes a degassing tail 345, which is in fluidic communication with the rest of the pouch 340 containing the cathode and the anode. Gases created in the cathode can be contained in the degassing tail 345, thereby regulating the gas pressure within the pouch 340.

In some embodiments, the degassing tail 345 is in direct communication with the rest of the pouch 340. In some embodiments, the degassing tail 345 can be separated from the rest of the pouch 340 by a pressure regulating membrane. Excess gas pressure in the pouch 340 can push open the pressure regulating membrane and release the gas into the degassing tail 345. In some embodiments, the boundary between the degassing tail 345 and the rest of the pouch 340 can be partially sealed. For example, a series of sealing points can be applied at the boundary between the degassing tail 345 and the rest of the pouch 340. In some embodiments the pouch 340 can extend over/past the cathode and anode foil tabs, with the degassing tail 345 positioned between or around the cathode and or anode tabs.

The degassing tail 345 can have various shapes. In some embodiments, the degassing tail 345 can be rectangular (including square). In some embodiments, the degassing tail 345 can be round. In some embodiments, the degassing tail 345 can be elliptical. In some embodiments, the degassing tail 345 can be polygonal.

In some embodiments, the volume ratio between the degassing tail 345 to the pouch 340 (i.e., the ratio of the degassing tail 345 to the volume of the entire pouch 340) can be about 5% to about 50% (e.g., about 5%, about 10%, about 15%, about 20%, about 25%, about 30%, about 35%, about 40%, about 45%, or about 50%, including any values and sub ranges in between).

In some embodiments, the degassing tail 345 can be configured to absorb 20% of the gas generated in the cathode. In some embodiments, the degassing tail 345 can be configured to absorb 30% of the gas generated in the cathode. In some embodiments, the degassing tail 345 can be configured to absorb 40% of the gas generated in the cathode. In some embodiments, the degassing tail 345 can be configured to absorb 50% of the gas generated in the cathode. In some embodiments, the degassing tail 345 can be configured to absorb 60% of the gas generated in the cathode.

In some embodiments, the degassing tail 345 and the pouch 340 can be made of the same material. In some embodiments, the degassing tail 345 and the pouch 340 can be made of different materials. For example, the pouch 340 can be made of a heat-resistant material while the degassing tail 345 can be made of a pressure-resistant or pliable material.

In some embodiments, the degassing tail 345 can be disposed at the top of the pouch 340 between the two tabs 315 and 325 (as shown in FIG. 3). In some embodiments, the degassing tail 345 can be disposed at the bottom of the pouch 340, opposite the two tabs 315 and 325. In some embodiments, the degassing tail 345 can be disposed on the left side and/or right side of the pouch 340. In some embodiments, the degassing tail 345 can be disposed on the front and/or back side of the pouch 340. In some embodiments, the degassing tail 345 can be disposed at the top of the pouch 340 outside either the cathode or anode tab.

In some embodiments, the electrochemical cell 300 can include only one degassing tail. In some embodiments, the electrochemical cell 300 can include more than one degassing tail. For example, the electrochemical cell 300 can include a first degassing tail between the two tabs 315 and 325 (as shown in FIG. 3) and a second degassing tail at the bottom of the pouch 340. In some embodiments, the electrochemical cell 300 can include a first degassing tail on the left side of the pouch 340 and a second degassing tail on the right side of the pouch 340.

Figure 4B:
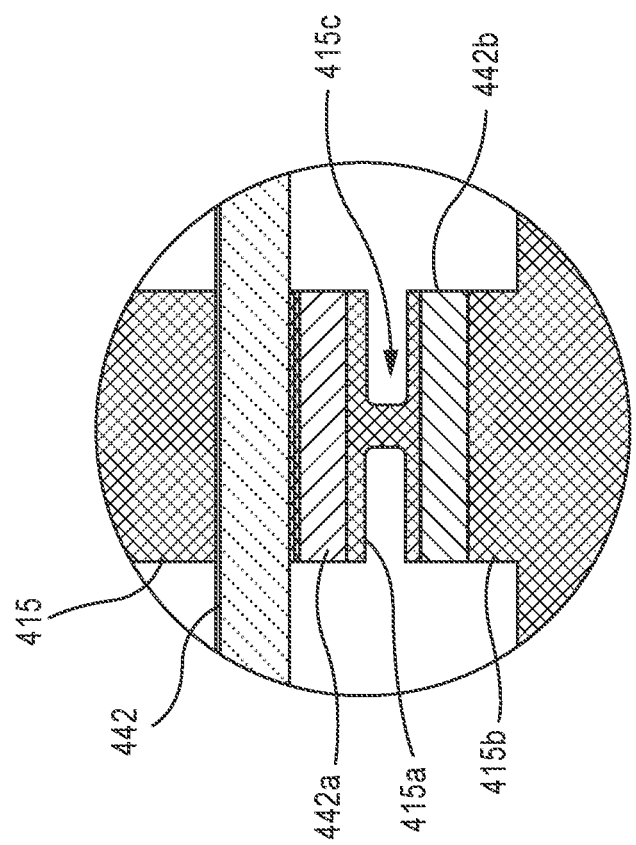
FIGS. 4A-4C show schematics of an electrochemical cell including a single pouch circuit interrupt device to protect the cell from overpressure due to gas generation, according to embodiments.
Figure 4A:
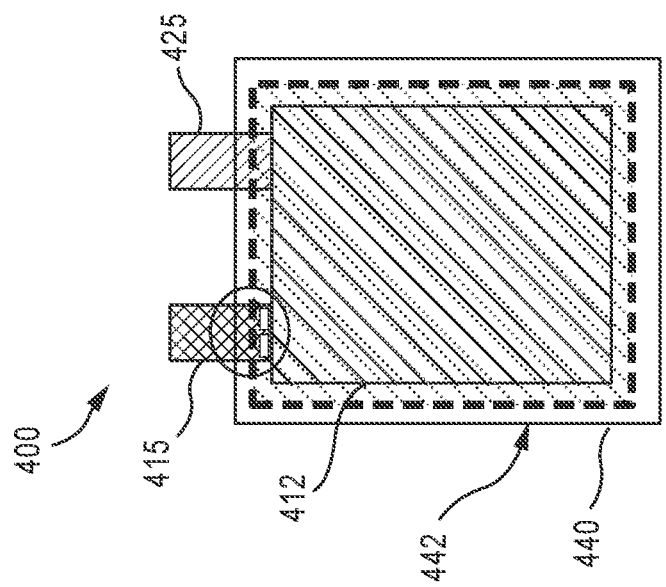
Figure 4C:
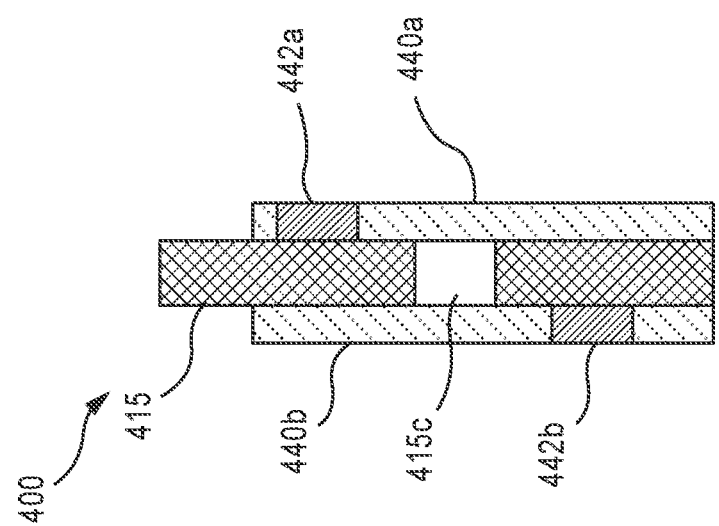

FIGS. 4A-4C shows schematics of an electrochemical cell 400 including a circuit interrupt device (CID) within the pouch to protect the cell 400 from overpressure. The electrochemical cell 400 includes a cathode (not seen from the front view) disposed on a cathode current collector 412, an anode disposed on an anode current collector (not seen from the front view), and a separator disposed in between. The assembly of the cathode, the cathode current collector 412, the anode, the anode current collector, and the separator is contained substantially in a pouch 440, which is sealed along a sealing perimeter 442. A cathode tab 415 is electrically connected to the cathode current collector 412 and extends beyond the pouch 440 for connection with the external circuit. Similarly, an anode tab 425 is electrically connected to the anode current collector and extends beyond the pouch 440 for connection with the external circuit.

FIG. 4B shows that the cathode tab 415 includes a neck portion 415c between two regular portions: a top portion 415a and a bottom portion 415b. The neck portion 415c has a reduced width compared to the other portions 415a and 415b. FIG. 4C shows that the pouch 440 is made of two films 440a and 440b sealed by heating sealing. The top portion 415a is coupled to a top sealing area 442a of the first film 440a, and the bottom portion 415b is coupled to a bottom sealing area 442b of the second film 440b. As shown in FIG. 4C, the top sealing area 442a is above the neck portion 415c and the bottom sealing area 442b is below the neck portion 415c. Therefore, when gases are generated within the pouch 440, the gases can fill any space within the pouch until the sealing areas (442a and 442b). Since the top sealing area 442a is higher than the bottom sealing area 442b, gases can enter into the space between the film 440a and the neck portion 415c. However, gases may not enter into the space between the neck portion 415c and the bottom sealing area 442b because that area is beyond the sealing area 442b. As a result, the gases can impose a force perpendicular to the neck portion 415c. When the force is above a threshold, the force can break the neck portion 415c and disconnect the electrochemical cell 400 from the external circuit, thereby protecting the cell 400 as well as the external circuit.

In some embodiments, the width ratio of the neck portion 415c to the top/bottom portions 415a/b can be about 0.1 to about 0.9 (e.g., about 0.1, about 0.2, about 0.3, about 0.4, about 0.5, about 0.6, about 0.7, about 0.8, or about 0.9, including any values and sub ranges in between).

In some embodiments, the absolute width of the neck portion 415c can be about 200 μm to about 2 mm (e.g., about 200 μm, about 300 μm, about 500 μm, about 750 μm, about 1 mm, about 1.2 mm, about 1.4 mm, about 1.6 mm, about 1.8 mm, or about 2 mm, including any values and sub ranges in between).

In some embodiments, the length of the neck portion 415c can be about 1 mm to about 10 mm (e.g., about 1 mm, about 2 mm, about 3 mm, about 4 mm, about 5 mm, about 6 mm, about 7 mm, about 8 mm, about 9 mm, or about 10 mm, including any values and sub ranges in between).

In some embodiments, the neck portion 415c and the top/bottom portions 415a/b can be made of the same material. In some embodiments, the neck portion 415c can be made of a first material and the top/bottom portions 415a/b can be made of a second material different from the first material. The first material can have less mechanical strength compared to the second material so as to facilitate the breaking of the neck portion 415c upon external forces.

In some embodiments, the neck portion 415c can include one bridge connecting the top portion 415a with the bottom portion 415b. In some embodiments, the neck portion 415c can include multiple bridges connecting the top portion 415a with the bottom portion 415b.

Figure 5:
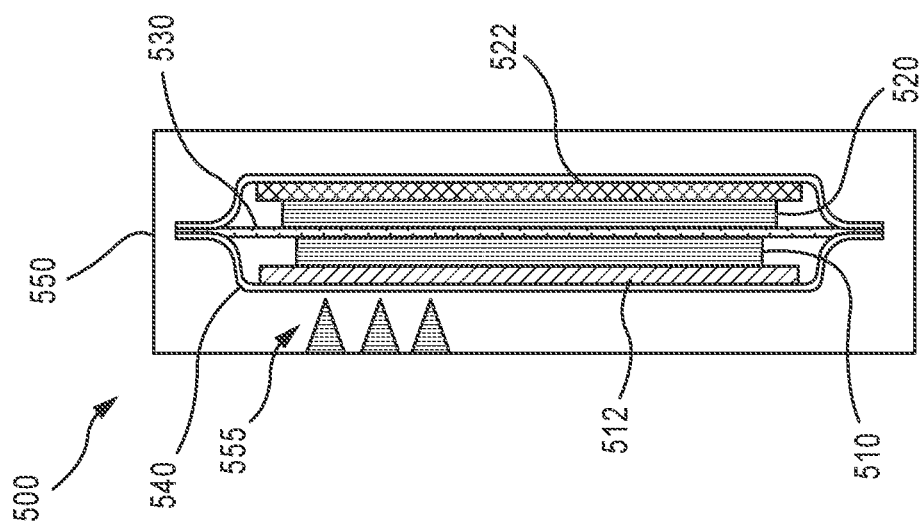
FIG. 5 shows a schematic of an electrochemical cell including needles inside a cell can to protect the cell from overpressure, according to embodiments.

FIG. 5 shows a side view of an electrochemical cell 500 including needles to protect the cell 500 from overpressure. The electrochemical cell 500 includes a cathode 510 disposed on a cathode current collector 512, an anode 520 disposed on an anode current collector 522, and a separator 530 disposed in between. The assembly of the cathode 510, the cathode current collector 512, the anode 520, the anode current collector 522, and the separator 530 can be configured to be contained substantially in a pouch 540. The pouch 540, in turn, is configured to be substantially contained in a case 550. A plurality of needles 555 can be disposed on the inner wall of the case 550 toward the cathode side of the cell 500. When the pouch 540 inflates due to creation of gases within the pouch 540, the needles 555 can puncture open the pouch 540 so as to prevent the cell 500 from overpressure.

In some embodiments, the needles 555 can be made of metal(s). In some embodiments, the needles 555 can be made of plastics. In some embodiments, the needles 555 can be made of any other rigid materials known in the art.

In some embodiments, the needles 555 can include only one needle. In some embodiments, the needles 555 can include multiple needles.

In some embodiments, the length of the needles 555 can be about 0.5 mm to about 5 mm (e.g., about 0.5 mm, about 1 mm, about 2 mm, about 3 mm, about 4 mm, or about 5 mm, including any values and sub ranges in between).

FIGS. 6A-6C illustrate a safety mechanism employing delamination of electrodes for dealing with electrochemical cells that exceed a predetermined pressure threshold, according to some embodiments. In FIGS. 6A-6C, the electrochemical cell 600 includes a cathode 610 disposed on a cathode current collector 612, an anode 620 disposed on an anode current collector 622, and a separator 630 disposed in between. The assembly of the cathode 610, the cathode current collector 612, the anode 620, the anode current collector 622, and the separator 630 can be configured to be contained substantially in a pouch 640.

FIG. 6B shows that the pressure within the pouch 640 increases beyond a pre-set pressure threshold. In this case, the pouch 640 can inflate and the anode 620 can detach from the separator 630, thereby electrically disconnecting the anode 620 from the cathode 610. In this case, the electrochemical cell 600 can be prevented from further charging. In some embodiments, the cathode 610 can be configured to detach from the separator 630 when the pressure within the pouch 640 increases beyond a pre-set pressure threshold, thereby electrically disconnecting the cathode 610 from the anode 620 and preventing the electrochemical cell 600 from further discharging. In some embodiments, at least one of the cathode 610 and the anode 620 can be configured to detach from at least one of the cathode current collector 612 and the anode current collector 622 when the pressure within the pouch 640 increases beyond a pre-set pressure threshold, thereby electrically disconnecting the cathode 610 from the anode 620 and preventing the electrochemical cell 600 from further charging and/or discharging.

FIG. 6C also shows that the internal pressure within the pouch 640 is beyond a threshold pressure. In FIG. 6C, part of the anode 620a stay coupled to the anode current collector 622 and detached from the separator 630, while the other part of the anode 620b stay attached to the separator 630. This can also at least partially disconnect the electrochemical cell 600 from the external circuit and protect the electrochemical cell 600. In this mechanism, a first area of the lamination 620a can be strategically designed to delaminate from a first surface (e.g., a current collector) while a second area of the lamination 620b can be configured to delaminate from a second surface (e.g., the separator 630) so as to separate the cathode 610 and the anode 620 from staying in electrochemical or electrical contact. Said another way, the safety mechanism is designed to physically separate the cathode 610 and anode 620 from being or operating as an electrochemical cell 600. The first area of lamination 620a can include a first portion of the cathode 610, a first portion of the anode 620, or both. The second area of lamination 620b can include a second portion of the cathode 610, a second portion of the anode 620, or both.

In some embodiments, the first portion of the cathode 610 or the anode 620 can be adhered to the cathode current collector 612 or the anode current collector 622 using a first adhesive and can be adhered to the separator 630 using a second adhesive such that the first portion of the cathode 610 or the anode 620 is configured to delaminate preferably from the separator 630. In some embodiments, the use of the first and second adhesive can be reversed such that the second portion of the of the cathode 610 or the anode 620 is configured to delaminate preferably from the cathode current collector 612 or the anode current collector 622.

Although the description above discusses protection measures individually with reference to each figure, more than one measure can be used for one cell. For example, one cell can include both a vent (as shown in FIGS. 1A-1C) and a porous separator (as shown in FIGS. 2A-2C). In another example, one cell can include both a degassing tail (as shown in FIG. 3) and a CID (as shown in FIGS. 4A-4C). Any other combination is also possible.

The invention claimed is:

1. An apparatus, comprising:
   a casing for an electrochemical cell, the casing including a first portion having a first sealing region, and a second portion having a second sealing region,
   the first portion of the casing configured to partially define a first cavity configured to receive a cathode, the cathode electrically coupled to a cathode current collector, and the second portion of the casing configured to partially define a second cavity configured to receive an anode, the anode electrically coupled to an anode current collector;
   a substantially planar separator disposed between the cathode and the anode, the separator extending from the first sealing region to the second sealing region and coupled to a portion of the first sealing region and a portion of the second sealing region such that axial ends of the separator form a part of the first sealing region and the second sealing region,
   wherein the separator is configured to deform and physically separate from the at least one of the anode and the cathode when the gas pressure inside at least one of the first cavity and the second cavity exceeds a threshold, thereby terminating operation of the electrochemical cell.

2. The apparatus of claim 1, wherein the electrochemical cell includes a thinned portion of the casing configured to open when the gas pressure within at least one of the first cavity and the second cavity exceeds a vent threshold.

3. The apparatus of claim 2, wherein the vent threshold gas pressure is between 5 psi and 2,000 psi.

4. The apparatus of claim 2, wherein the thinned portion has a thickness ratio of less than 0.5 compared to other portions of the casing.

5. The apparatus of claim 1, further comprising:
   a cathode tab electrically coupled to the cathode; and
   an anode tab electrically coupled to the anode,
   wherein at least one of the cathode tab or the anode tab includes a neck portion configured to break when the gas pressure within at least one of the first cavity and the second cavity exceeds the threshold.

6. The apparatus of claim 1, wherein the cathode is configured to physically separate from the separator when the difference in gas pressure between the first cavity and the second cavity exceeds the threshold, thereby terminating electronic and ionic operation of the electrochemical cell.

7. The apparatus of claim 1, wherein the anode is configured to physically separate from the separator when the difference in gas pressure between the first cavity and the second cavity exceeds the threshold, thereby terminating electronic and ionic operation of the electrochemical cell.

8. An apparatus, comprising:
   a casing for an electrochemical cell, the casing including a first portion having a first sealing region, and a second portion having a second sealing region, the first portion of the casing configured to partially define a first cavity configured to receive a cathode, the cathode electrically coupled to a cathode current collector, and the second portion of the casing configured to partially define a second cavity configured to receive an anode, the anode electrically coupled to an anode current collector;
   a substantially planar separator disposed between the cathode and the anode and coupled to at least one of the anode and the cathode via an adhesive, the separator coupled to a portion of the first sealing region and a portion of the second sealing region such that axial ends of the separator form a part of the first sealing region and the second sealing region,
   wherein at least a portion of the adhesive is configured to cause the separator to deform and delaminate from at least one of the anode and the cathode when the gas pressure inside the first cavity or the second cavity exceeds a threshold, thereby terminating operation of the electrochemical cell.

9. The apparatus of claim 8, wherein the electrochemical cell includes a thinned portion of the casing configured to open when the gas pressure within at least one of the first cavity and the second cavity exceeds a vent threshold.

10. The apparatus of claim 9, wherein the vent threshold gas pressure is between 5 psi and 2,000 psi.

11. The apparatus of claim 9, wherein the thinned portion has a thickness ratio of less than 0.5 compared to other portions of the casing.

12. The apparatus of claim 8, further comprising:
   a cathode tab electrically coupled to the cathode; and
   an anode tab electrically coupled to the anode,
   wherein at least one of the cathode or the anode includes a neck portion configured to break when the gas pressure within at least one of the first cavity and the second cavity exceeds the threshold.

13. The apparatus of claim 8, wherein a portion of the cathode is configured to delaminate from the separator when the difference in gas pressure between the first cavity and the second cavity exceeds the threshold, thereby terminating electronic and ionic operation of the electrochemical cell.

14. The apparatus of claim 8, wherein a portion of the anode is configured to delaminate from the separator when the difference in gas pressure between the first cavity and the second cavity exceeds the threshold, thereby terminating electronic and ionic operation of the electrochemical cell.

* * * * *